Figure 1:
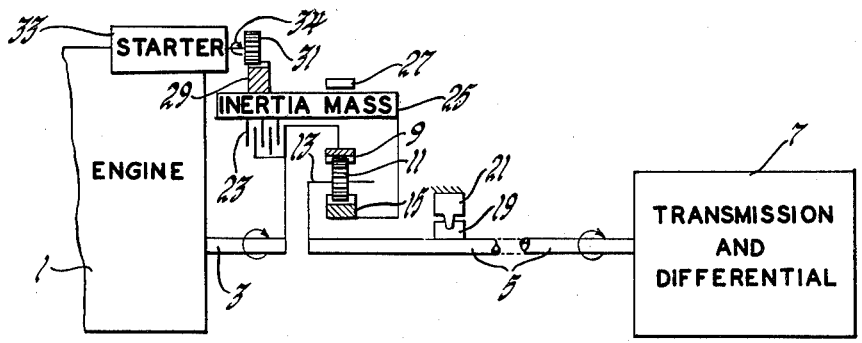

Feb. 12, 1963 C. S. CHAPMAN, JR 3,077,115
VEHICLE DRIVE AND STARTING TRANSMISSIONS
Filed Dec. 7, 1960

INVENTOR.
Charles S. Chapman, Jr.
BY
Robert B. Gerhardt
ATTORNEY

United States Patent Office 3,077,115
Patented Feb. 12, 1963

3,077,115
VEHICLE DRIVE AND STARTING
TRANSMISSIONS
Charles S. Chapman, Jr., Grand Blanc, Mich., assignor to General Motors Corporation, Detroit, Mich., a corporation of Delaware
Filed Dec. 7, 1960, Ser. No. 74,375
4 Claims. (Cl. 74—7)

This invention relates to motor vehicles and more particularly to speed change transmissions in motor vehicles usable for both vehicle drive and engine starting.

In order to distribute weight more evenly in a motor vehicle and to eliminate some of the hump in the floor, it is advantageous to locate the normal multi-speed transmission at the rear of the vehicle adjacent to or combined with the rear axle differential. This requires that the propeller or drive shaft rotate at engine speed at all times even through the transmission is in neutral. In such an installation there is also a problem of providing linkage from the accelerator throttle control to the transmission for forced or kick down shifts in the transmission.

The high compression large engines currently utilized in motor vehicles require a relatively high torque drive to start the same. Starting torque of the engine starting motor is usually multiplied by driving the engine through a starting motor pinion and a flywheel ring gear attached to the engine. The torque multiplication of such an arrangement is limited by the smallest size pinion gear that can be used and by the largest size ring gear that can be accommodated. The flywheel inertia required for engine starting and smooth idle is also a limiting factor. It would be advantageous if an additional starting torque multiplication were provided to allow the use of a smaller ring gear and also if a smaller diameter but relatively high mass flywheel were utilized.

In automatic transmissions employing gear pumps that supply oil under pressure for hydrodynamic drives, fluid servos and controls, it is desirable to keep the input or engine driven pump primed. This becomes a problem when the pumps are located at a level above the oil level in the transmission oil sump and where the transmission input shaft may be disconnected at times from the vehicle engine. Where such a disconnection is made the pump can rotate backwards from its normal direction of rotation. It is therefore desirable to prevent reverse rotation of the transmission input shaft, to prevent reverse rotation of the input shaft pump.

It is therefore an object of this invention to provide a simple gearing arrangement for a vehicle but will provide neutral drive, gear reduction and direct drive between an engine and a drive shaft connected to drive a rear mounted transmission.

It is a further object to provide such a gear arrangement that will increase the starter motor torque drive of the engine during starting thereof.

It is still another object to provide such a gear arrangement wherein the drive shaft and connected transmission input shaft are prevented from reverse rotation.

Figure 2:
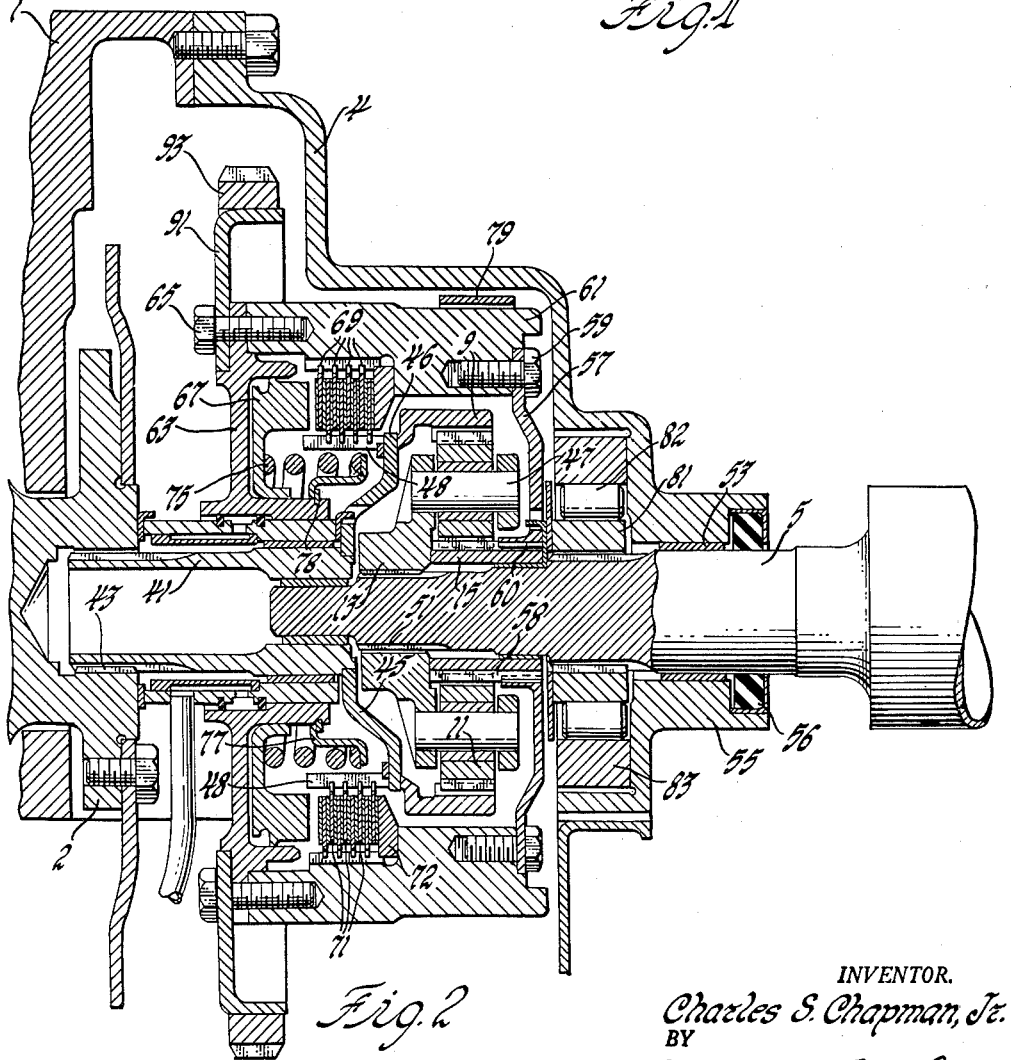

These and other objects and advantages will be apparent from the following description and accompanying drawing in which:

FIGURE 1 is a diagrammatic showing of an engine, gearing, starter motor and transmission arrangement; and FIGURE 2 is a sectional view showing details of the gear arrangement.

Referring to FIGURE 1, an engine 1 has an ouput shaft 3 rotatable in the direction of the arrow. A propeller or drive shaft 5 extends from the rear of the shaft 3 to a combined transmission and differential unit 7 located at the rear of the vehicle. The ratio changing components of the unit 7 could be located immediately to the rear of the front gear unit, however, the full advantage of the present invention is best obtained with the transmission at the vehicle rear.

The engine shaft 1 is connected to continuously drive a ring gear 9 of a simple planetary gear unit which also includes a plurality of planet pinions 11 journalled on a planet carrier 13 and meshing with the ring gear 9 and a sun gear 15. The gear carrier 13 is connected to drive the propeller shaft 5. The freewheel device 19—21 prevents reverse rotation of the propeller shaft 5. The freewheel device is shown in FIGURE 1 as a ratchet device in which the inner member 19 attached to the shaft 5 can freely rotate in a forward or counterclockwise direction as viewed from the left of FIGURE 1, but which is prevented by the outer element 21 from rotation in a rearward or clockwise direction as viewed from the left.

The input shaft 3 can be connected by a suitable clutch member 23, shown as a friction multiple disk clutch, to an inertia mass member 25. The sun gear 15 is connected to the inertia or flywheel member 25. A brake member 27, shown as a band, can be applied to prevent rotation of the mass 25 and sun gear 15. An external tooth ring gear 29 is attached to the inertia mass 25 for drive thereof. Shown engaging the ring gear 29 is a pinion gear 31. A starter motor 33, that rotates in the direction of the arrow 34, drives the pinion gear 31 in any conventional manner. Thus, the starter drive may be an overrunning clutch drive or an axially splined torque drive or any other type of drive in which the starter motor 33 drives the ring gear 29 only during starting and cannot be driven by the gear 29.

FIGURE 2 shows the details of the gearing arrangement. The engine 1 has its crankshaft 2 internally splined at 43 to a transmission input sleeve shaft 41. Secured to the end of the shaft 41 is a flange member 45 having an outer portion 46 radially extending into slots 48 formed in an axial extension of the ring gear 9. The planet pinions 11 are journalled on pins 47 supported on a carrier member 13 splined at 51 on the forward end of the propeller shaft 5. The shaft 5 is piloted in the sleeve shaft 41 and is also supported by a sleeve bearing 53 located in a hub portion 55 of an outer case member 4 bolted to the engine 1. A seal 56 retains lubricant in the gear assembly.

A sun gear 15 is journalled on the propeller shaft 5 with a portion of the teeth 58 thereon engaging the teeth on the planet pinions 11 and a portion engaging the spline teeth 60 formed on the inner hub portion of a flange member 57. The flange member 57 is connected to an inertia flywheel member 61 by bolts 59. Also connected by bolts 65 to the flywheel member 61 is a clutch cylinder 63. An annular clutch piston 67 is reciprocably mounted in the clutch cylinder.

Internally splined in the flywheel member 61 are a plurality of friction discs 69 that are interposed between a plurality of clutch friction discs 71 splined in slots 48 formed in the ring gear 9. An annular clutch pressure plate 72 abuts the flywheel member 61. A clutch release spring 75 engages the piston 67 at the end thereof to urge the piston to the left and engages a retainer member 77 at the other end. A snap ring 78 in the cylinder 63 holds the retainer 77 from movement to the right and provides a reaction for the clutch release spring.

The bolts 65 that secure the clutch cylinder 63 to the flywheel 61 also secure a ring gear disk 91 having teeth 93 thereon. The teeth 93 engage the starter pinion gear 31 shown in FIGURE 1. Splined on the propeller shaft 5 is the inner race 81 of the freewheel device 19—21 of FIGURE 1 which includes rollers 82 and an outer race 83 fastened to the outer case member 4.

*Operation*

To start the engine both the friction members 23 and 27 are released. In this condition if the starter motor 33 is energized to cause pinion 31 to drive the ring gear 29 in clockwise direction as viewed from the left of FIGURE 1, the inertia mass 25 and connected sun gear 15 are caused to rotate in the same direction. The compression and inertia of the engine provides a load on the planet ring gear 9 so that the carrier 13 tries to move reversely or clockwise. The freewheel device 19—21 prevents such reverse movement of the shaft 5 and carrier 13 and the gear 9 and shaft 3 are caused to rotate forward or counterclockwise at a reduced speed and increased torque. This turns the engine for starting the same.

The the engine stars, the ring gear 9 drives the sun gear 15 through the pinions 11 at a faster rate than the starter motor 33 drives the same, at which time the starter overrun or disengagement device becomes effective in known manner. When the starter motor is deenergized, the ring gear 29, mass 25 and sun gear 15 are free to rotate reversely and the planetary gearing cannot transmit any drive to the propeller shaft 5.

Forward motion of the vehicle can be begun with the gear unit 9—11—15 conditioned either for reduction drive or direct drive with the rear transmission 7 providing the normal starting reduction ratio. Thus, the reduction ratio of the front gearing can be utilized for both as a starting gear and as a passing gear, or it can be used solely as a passing gear. If it is used as a starting gear there would be provided automatic controls to control the friction elements 23 and 27. In such a case where the gearing is to be used as a starting reduction gear, the band 27 is engaged to hold the inertia mass 25 and sun gear 15 from rotation. Forward drive of the ring gear 9 by the engine will then cause the carrier 13 and propeller shaft 5 to rotate forwardly at a reduced speed.

Direct drive in the gear unit is obtained by applying the clutch 23 and releasing the band 27. This connects both the sun gear 15 and ring gear 9 to the input shaft 3 locking the gearing for direct drive. During the gear shift the inertia mass 25 aids in making a smooth shift. The mass 23 is chosen so that its moment of inertia added to that of the sun gear 15, when multiplied by its total change in speed during a gear shift, is equal to the moment of inertia of the input shaft and associated parts multiplied by their total change in speed during the gear shift. This balanced inertia construction and operation thereof is fully described in the patent application S.N. 504,992 by Oliver K. Kelly et al. entitled "Balanced Inertia Plural Stop Ratio Transmission," filed April 29, 1955, now Patent No. 3,023,636, and assigned to the assignee of the present invention.

Forced or kickdown downshifts are made by releasing the clutch 23 and reapplying the band 27. When the engine is stopped, or the gear unit conditioned for neutral with both band 27 and clutch 23 disengaged, the freewheel device 19—21 prevents the propeller shaft 5 from reverse rotation and thus prevents the rear transmission input shaft and associated oil pump from rotating reversely. This acts to maintain that oil pump primed since the pump cannot pump oil out of the system back to the oil sump.

Changes, modifications and other applications will be readily apparent to those skilled in the art and such changes and applications are deemed to be within the scope of the invention which is limited only by the following claims.

I claim:

1. In a motor vehicle having an engine with an output shaft and a drive shaft the combination including a planetary gear set having an input gear member, an output gear member and a reaction gear member, means connecting said input gear member for drive by said engine output shaft, means connecting said output gear member with said drive shaft, means for holding said reaction gear member against rotation to establish drive from said engine to said drive shaft at a reduced speed ratio, means for connecting two of said gear members for common rotation to establish drive from said engine to said drive shaft at a one to one speed ratio, an engine starter motor, means for connecting said motor to said reaction gear member for drive thereof by said motor, and means for holding said output gear member against rotation to provide reaction in said gear set to establish drive from said starter motor to said engine shaft at a reduced speed ratio.

2. In a motor vehicle having an engine with an output shaft and a drive shaft arranged to propel the vehicle, the combination including a planetary gear set having an input gear member, an output gear member and a reaction gear member, means connecting said input gear member for drive by said engine output shaft, means connecting said output gear member with said drive shaft, releasable means for holding said reaction gear member against rotation to establish drive from said engine to said drive shaft at a forward reduced speed ratio, means for connecting two of said gear members for common rotation to establish drive from said engine to said drive shaft at a one to one forward speed ratio, an engine starter motor, means for connecting said motor to said reaction gear member for drive thereof by said motor, and one-way means for holding said output gear member against reverse rotation to provide reaction in said gear set to establish drive from said starter motor to said engine shaft at a reduced speed ratio.

3. In a vehicle having an engine, a drive shaft, and a starter motor, a transmission for providing a plurality of drive ratios between the engine and the drive shaft during drive of the vehicle and for providing a reduced speed ratio between the starter motor and the engine during engine starting, said transmission including a planetary gear set having a ring gear, a sun gear and a plurality of planet pinions meshing with the sun gear and the ring gear and journalled on a carrier, means connecting said ring gear to said engine for drive thereof, releasable means for holding said sun gear against rotation to provide torque reaction in said gearing and establish a forward reduced speed ratio drive between said engine and said drive shaft, releasable means for connecting said ring gear and said sun gear to establish a one to one forward drive between said engine and said drive shaft, gear means connected to said sun gear, means for transmitting drive from said starter motor to said gear means for drive of said sun gear, and releasable means for preventing reverse rotation of said drive shaft and said carrier to provide torque reaction in said gear set and establish a reduced ratio drive between said starter motor and said engine.

4. In a vehicle having an engine, a drive shaft, and a starter motor, a transmission for providing a plurality of drive ratios between the engine and the drive shaft during drive of the vehicle and for providing a reduced speed ratio between the starter motor and the engine during engine starting, said transmission including a planetary gear set having a ring gear, a sun gear and a plurality of planet pinions meshing with the sun gear and the ring gear and journaled on a carrier, means connecting said ring gear to said engine for drive thereby, means connecting said carrier to said drive shaft for drive thereof, releasable brake means for holding said sun gear against reverse rotation to provide torque reaction in said gearing and establish a forward reduced speed ratio drive between said engine and said drive shaft, releasable clutch means for connecting said ring gear and said sun gear to establish one to one forward speed drive between said engine and said drive shaft, gear means connected to said sun gear, releasable means for transmitting from said starter motor to said gear means for drive of said sun gear, and a one way brake means for preventing reverse rotation of said drive shaft and said carrier to provide torque reaction in said gear set and establish a reduced speed ratio drive between said starter motor and said engine.

References Cited in the file of this patent

UNITED STATES PATENTS

| | | |
|---|---|---|
| 1,259,829 | Brown | Mar. 19, 1918 |
| 1,887,607 | Waseige | Nov. 15, 1932 |
| 2,908,189 | Parker et al. | Oct. 13, 1959 |

FOREIGN PATENTS

| | | |
|---|---|---|
| 809,405 | Great Britain | Feb. 25, 1959 |